United States Patent [19]
Richardson

[11] 3,724,812
[45] Apr. 3, 1973

[54] DAMPER ASSEMBLY
[75] Inventor: Donald C. Richardson, Clarkston, Mich.
[73] Assignee: Warren Fastener Corporation, Mount Clemens, Mich.
[22] Filed: Nov. 17, 1971
[21] Appl. No.: 199,627

[52] U.S. Cl. ................................................251/306
[51] Int. Cl. ..............................................F16k 1/26
[58] Field of Search...............251/306, 305, 307, 308

[56] References Cited
UNITED STATES PATENTS
3,595,533   7/1971   Felton ...............................251/306

Primary Examiner—Henry T. Klinksiek
Attorney—Richard B. Megley et al.

[57] ABSTRACT

A tough, light weight and economical damper assembly is provided by molding a flexible plastic sealing margin into the slotted locking rim of a relatively rigid plastic main body.

5 Claims, 3 Drawing Figures

DAMPER ASSEMBLY

BACKGROUND OF THE INVENTION

Pivotal butterfly valves are employed in great variety. Where possible they should be simple to operate, require low operating force, be durable despite adverse environment, effectively seal an opening in the mounting structure, and be producable at low cost. In some instances sealing has been secured as by vulcanizing and at other times the sealing damper has been disposed as an O or triangular shaped ring within a groove in the housing. These arrangements and when employing the usual materials have commonly been unsatisfactory in that the sealing often loosens or becomes malformed.

While it will be apparent that the invention has application to dampers for regulating fluid flow in a wide variety of situations, a particular field of use contemplated is in controlling air flow through the fire wall of a vehicle and thus conditioning its passenger compartment. Thus, for instance, rotational opening of the damper assembly by manual and/or automatic means is relied upon to regulate volume of air delivered and temperature control of the compartment.

SUMMARY OF THE INVENTION

It is therefore an object of this invention to provide an effective, adaptable damper assembly which is fire resistant, light weight, and relatively simple to manufacture.

A further object of the invention is to provide a panel type pivotal damper comprised entirely of plastic except for its operating means.

To these ends, a feature of the invention resides in a pivotal damper assembly comprising a generally flat rigid panel corresponding in shape to the opening in which it is to operate, its outer edge being formed with a peripheral groove having locking cavities for anchoring a flexible sealing margin. Also, as illustrated, the panel may be molded onto a transverse crank or operating arm when the panel itself is formed with a peripheral groove for receiving the sealing margin.

BRIEF DESCRIPTION OF THE DRAWINGS

The foregoing and other features of the invention will now be more particularly described in connection with an illustrative embodiment, and with reference to the accompanying drawings thereof, in which.

DESCRIPTION OF THE INVENTION

Figure 1:
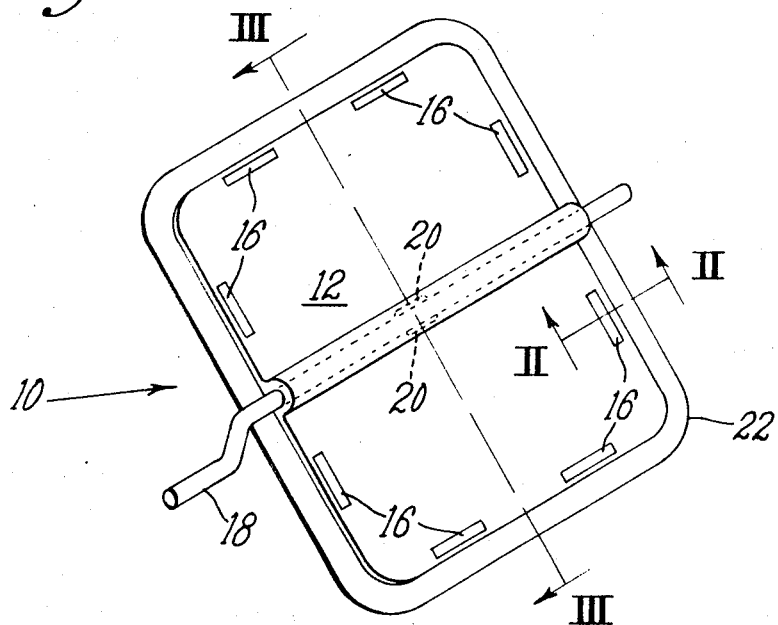
FIG. 1 is a perspective view of a damper assembly or vent air valve.
Figure 2:
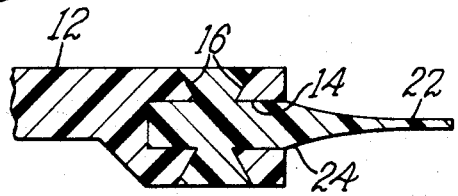
FIG. 2 is a section taken on the line II—II of FIG. 1.
Figure 3:
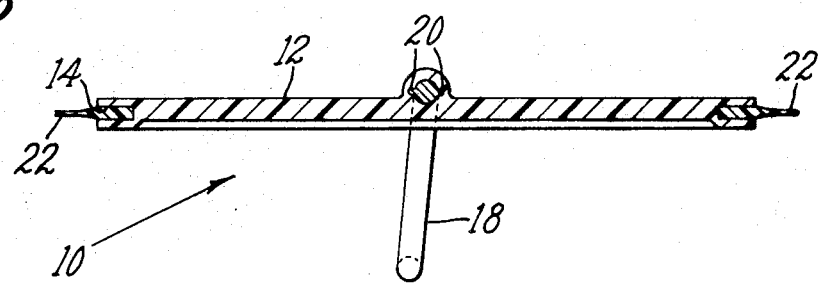
FIG. 3 is a section taken on the line III—III of FIG. 1.

A composite damper assembly 10 (FIG. 1) comprises a body panel 12 of generally flat configuration to correspond with a vent opening (not shown, but rectangular, for instance) to control flow of gas therethrough. The inner portion of the panel 12 may be a fairly thin web and the peripheral portion is thickened and has its outer edge continuously grooved as indicated at 14 in FIGS. 2 and 3. Oppositely disposed, spaced marginal face portions of the panel are formed with slots 16 for a purpose to be mentioned and communicating with the groove 14.

While the panel 12 may be of any suitable material, a plastic panel molded in substantially rigid form and incorporating asbestos to provide fire resistance is one desirable form for mounting in a fire wall of a vehicle. In forming the panel one side of it preferably is molded about an operating means such as a crank arm 18 having tangs 20 for securing the panel thereto against relative rotation. It will be understood that the arm 18 has bearings in the fire wall or other mounting structure whereby the damper assembly 10 is rotatable between open and closed positions.

Molded into the groove 14 and the slots 16 is a uniform circumferential sealing margin 22 of flexible material. One material satisfactory for this purpose is a formulation of polyvinyl chloride having a durometer reading on the order of about 55. The sealing margin is desirably symmetrically tapered as at 24 as it extends outwardly from the panel 12 and hence provides thin seating portions which conform to overlap the rim of an aperture in the mounting structure. As clearly shown in FIG. 2 the molded flexible material completely fills the double, swallow-tail slots 16 thereby locking the sealing margin securely to the panel 12.

When the arm 18 is disposed to provide a fulcrum midlength of the damper assembly 10, it will be apparent that half of the projecting sealing margin 22 may overlap and seat on one side of the mounting structure, and the other half of the margin 22 will similarly seat on the opposite side of the structure. Little energy is required to position the damper assembly because of its low mass, and it will provide a long operating life despite adverse operating environment.

Having thus described my invention what I claim as new and desire to secure by Letters Patent of the United States is:

1. A damper assembly comprising a generally flat body panel corresponding in configuration to, but smaller than, an opening in a mounting structure, the outer edge of the panel being grooved and the groove communicating at spaced localities with a face of the panel, and a flexible plastic sealing margin molded into the groove to be locked to the panel at said localities, the margin uniformly extending outwardly from the panel edge for sealing relation with the structure, and operating means molded into the panel for controlling relative rotation of the assembly relative to the mounting structure.

2. A damper assembly as in claim 1 wherein the body panel is of relatively rigid, molded plastic, its outer marginal portion being thickened to accommodate the edge groove and said spaced localities which respectively are formed with at least one dove-tailed slot for anchoring the flexible sealing margin.

3. A damper assembly as in claim 1 wherein the body panel includes a stiff, thin inner portion that is molded transversely to receive the operating means in the form of a crank arm in relatively non-rotative relation.

4. A damper assembly as set forth in claim 2 wherein the dove-tailed slots are oppositely disposed, and the sealing margin tapers outwardly from the grooved edge of the panel.

5. An assembly as set forth in claim 4 wherein the sealing margin symmetrically tapers outwardly and has a low durometer adapting it for conformity with the rim of the mounting opening.

* * * * *